(12) United States Patent
Kim et al.

(10) Patent No.: US 8,335,887 B2
(45) Date of Patent: Dec. 18, 2012

(54) SOLID STATE STORAGE SYSTEMS AND METHODS FOR FLEXIBLY CONTROLLING WEAR LEVELING

(75) Inventors: Eui Jin Kim, Gyeonggi-do (KR);
Kyeong Rho Kim, Gyeonggi-do (KR);
Young Ho Kim, Gyeonggi-do (KR);
Jeong Soon Kwak, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 361 days.

(21) Appl. No.: 12/648,369

(22) Filed: Dec. 29, 2009

(65) Prior Publication Data

US 2011/0107016 A1    May 5, 2011

(30) Foreign Application Priority Data

Oct. 29, 2009   (KR) .......................... 10-2009-0103578

(51) Int. Cl.
*G06F 12/00*    (2006.01)
*G06F 13/00*    (2006.01)
*G06F 13/28*    (2006.01)

(52) U.S. Cl. ................. 711/103; 711/E12.008; 711/154

(58) Field of Classification Search ........................ None
See application file for complete search history.

(56) References Cited

U.S. PATENT DOCUMENTS

| | | | |
|---|---|---|---|
| 6,732,221 B2 | 5/2004 | Ban | |
| 6,985,992 B1* | 1/2006 | Chang et al. | 711/103 |
| 2007/0050536 A1 | 3/2007 | Kolokowsky | |
| 2008/0162786 A1* | 7/2008 | Shanmuganathan | 711/103 |
| 2008/0162796 A1 | 7/2008 | Chang et al. | |
| 2008/0282025 A1 | 11/2008 | Biswas et al. | |
| 2008/0313505 A1* | 12/2008 | Lee et al. | 714/47 |
| 2009/0077429 A1* | 3/2009 | Yim et al. | 714/54 |
| 2009/0089485 A1* | 4/2009 | Yeh | 711/103 |
| 2010/0023675 A1* | 1/2010 | Chen et al. | 711/103 |

FOREIGN PATENT DOCUMENTS

| | | |
|---|---|---|
| KR | 100297986 B1 | 5/2001 |
| KR | 1020020029899 A | 4/2002 |
| KR | 1020070099234 A | 10/2007 |
| KR | 100857761 B1 | 9/2008 |

* cited by examiner

*Primary Examiner* — Edward Dudek, Jr.
*Assistant Examiner* — Matthew Chrzanowski
(74) *Attorney, Agent, or Firm* — Ladas & Parry LLP

(57) ABSTRACT

Solid-state storage systems and methods are provided for controlling a wear leveling process for uniform use of the memory cells that replaces worn memory blocks with less frequently used memory blocks. The wear leveling process is performed by changing the physical locations of the storage cells within each memory zone or plane. Reference values of target memory block erase counts and worn memory block erase counts are used for searching target memory blocks to be used as replacements.

20 Claims, 4 Drawing Sheets

Block Erase Count

| | | 140 | 141 | 142 | 143 | 144 | 145 | 146 | 147 | 148 | 149 | 150 |
|---|---|---|---|---|---|---|---|---|---|---|---|---|
| Sensitivity | 1 | 7 | 8 | 9 | 10 | 11 | 12 | 13 | 14 | 15 | 16 | 17 |
| | 2 | 7 | 9 | 11 | 13 | 15 | 17 | 19 | 21 | 23 | 25 | 27 |
| | 3 | 7 | 10 | 13 | 16 | 19 | 22 | 25 | 28 | 31 | 34 | 37 |
| | 4 | 7 | 11 | 15 | 19 | 23 | 27 | 31 | 35 | 39 | 43 | 47 |
| | 5 | 7 | 12 | 17 | 22 | 27 | 32 | 37 | 42 | 47 | 52 | 57 |

SOLID STATE STORAGE SYSTEMS AND METHODS FOR FLEXIBLY CONTROLLING WEAR LEVELING

CROSS-REFERENCES TO RELATED APPLICATION

The present application claims priority under 35 U.S.C. §119(a) to Korean application number 10-2009-0103578, filed on Oct. 29, 2009, in the Korean Intellectual Property Office, which is incorporated herein by reference in its entirety.

BACKGROUND

The present invention relates to a solid-state storage system and a method for controlling the same, and more particularly, to a solid-state storage system for controlling wear leveling flexibly and a method for controlling the same.

In general, nonvolatile memories are widely used as storage memories for portable information devices. Furthermore, in recent years, solid state drives (SSDs) using NAND flash memories, for use in personal computers (PCs) instead of hard disk drives (HDDs), are commercially available, and are expected to make inroads into HDD markets.

Typically, the control of data files in solid-state storage systems such as SSDs is performed by writing, erasing and updating real data in pages designated by logical addresses that can identify the data files. More specifically, a logical address and a physical address of a data storage area are mapped by a Flash Translation Layer (FTL). Then, by referring to the logical address according to a command of a host (not shown), data may be written, erased and read at a location designated by the physical address mapped with the logical address. The physical address is information on the position of a page or a sub block in a memory area.

A NAND flash memory cell is a nonvolatile memory cell. Thus, when updating data of the NAND flash memory cell, the data of the corresponding cell must be first erased and new data must be then programmed. However, data is not programmed uniformly into all memory cells, and may be frequently programmed concentrating on specific cell areas. In other words, due to the frequent data program and erase operations, specific cell areas or some cells may be worn out and may not be used any more. Even though cells having fresh states are present, the entire performance of the solid-state storage system may be limited by the worn cells.

Therefore, before the memory cells are worn out, a wear leveling process for uniform use of the memory cells is performed by changing the physical locations of the storage cells within each memory zone or plane.

In order to execute the wear leveling process, information on the erase counts of all the blocks is stored in the NAND memory area. When the wear leveling process is required, the information on the erase counts of the blocks is loaded into a RAM buffer, and the physical locations of the blocks are changed by searching the replaceable blocks.

However, as the memory area is provided with a larger number of blocks according to the recent large-capacity SSD trend, the memory size of the RAM buffer into which the erase counts of all the blocks are loaded also inevitably increases. However, the increase in the memory size of the RAM buffer is limited by the cost and chip area.

SUMMARY

Aspects and embodiments of a solid-state storage system for controlling a wear leveling process are described herein.

Aspects and embodiments of a method for controlling a solid-state storage system for controlling a wear leveling process are described herein.

In one embodiment of the present invention, a solid state storage system includes a buffer unit configured to sequentially load a plurality of mapping pages where mapping information and erase counts are stored, and a memory controller configured to set an erase count reference value of a target block and the number of the mapping pages that are searching objects of the target block, in order to search the target block that is to replace the worn block, sample the mapping pages, and execute a wear leveling process thereon.

In another embodiment of the present invention, a solid-state storage system includes a flash memory area including a plurality of memory blocks configured to store a mapping page in which mapping information and erase counts are stored, and a memory controller configured to set a reference value for a number of searching targets with respect to a replacement block, which is to replace a worn block among the memory blocks during a wear leveling process by using an erase count reference value of the replacement block and information on the worn block, search an initial replacement block that is to be used as the target block, and replace the worn block with the searched replacement block.

In another embodiment of the present invention, a method for controlling a solid-state storage system includes the steps of, setting a first reference value by determining an erase count of a target block that is to replace a worn block during a wear leveling process, setting a second reference value by searching the target block according to the erase count of the worn block, searching the target block under the first and second reference values, and varying and updating the first reference value when the target block is not searched, and influencing a searching condition for a next target block.

BRIEF DESCRIPTION OF THE DRAWINGS

Features, aspects, and embodiments are described in conjunction with the attached drawings, in which.

DETAILED DESCRIPTION

As required, detailed embodiments of the present invention are disclosed herein. However, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Hereinafter, a solid-state storage system and a method for controlling the same according to the present approach, will be described below with reference to the accompanying drawings through preferred embodiments.

First, a solid-state storage system according to one embodiment will be described below with reference to FIGS. 1 and 2.

Figure 1:
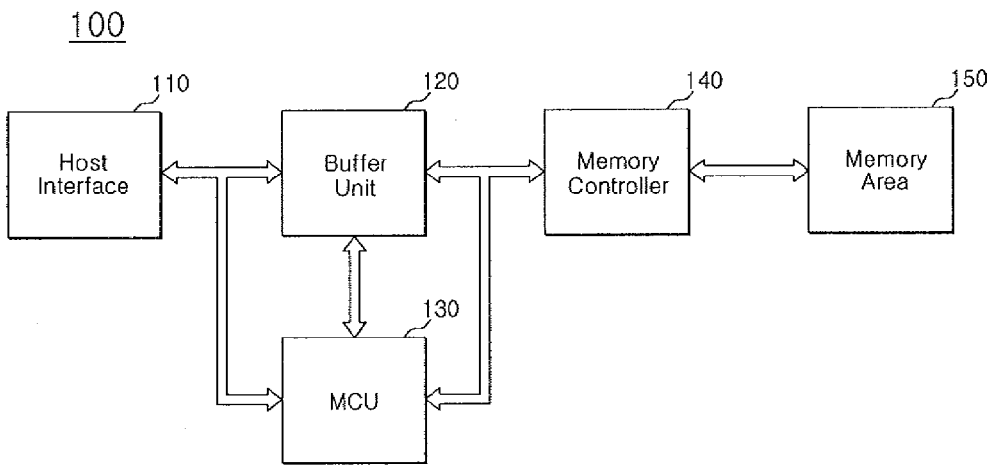
FIG. 1 is a block diagram of a solid state storage system according to one embodiment.
Figure 2:
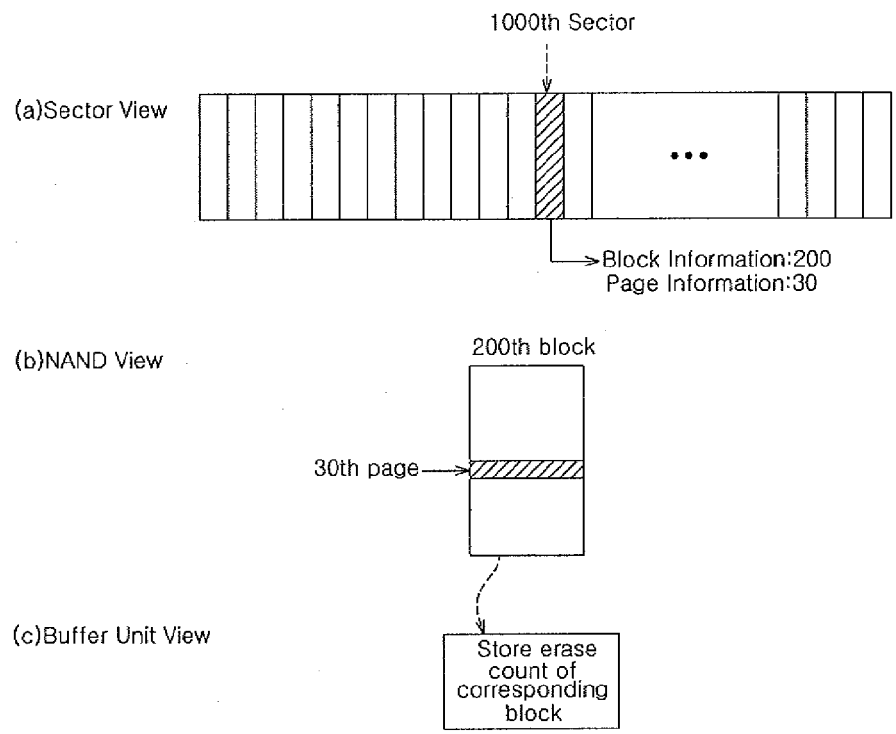
FIG. 2 is a conceptual block diagram illustrating an address mapping in FIG. 1.

FIG. 1 is a block diagram of a solid-state storage system 100 and FIG. 2 is a conceptual block diagram illustrating the relationship between a physical/logical address mapping table and a buffer unit 120. A storage system using a NAND flash memory is taken as an example of the solid-state storage system 100 set forth herein.

Referring to FIGS. 1 and 2, the solid-state storage system 100 includes a host interface 110, a buffer unit 120, a micro control unit (MCU) 130, a memory controller 140, and a memory area 150.

The host interface 110 is connected to the buffer unit 120. The host interface 110 transmits and receives control commands, address signals, and data signals between an external host (not shown) and the buffer unit 120. An interface scheme between the host interface 110 and the external host (not shown) may be any one of Serial Advanced Technology Attachment (SATA), Parallel Advanced Technology Attachment (PATA), SCSI, Express Card, PCI-Express, for example, but is not limited thereto.

The buffer unit 120 buffers signals outputted from the host interface 110, or temporarily stores mapping information between a logical address and a physical address, block allocation information of the memory area 150, external data, block erase counts, and external data, for example. The buffer unit 120 may be a buffer using a static random access memory (SRAM) or a dynamic random access memory (DRAM), for example. As illustrated in FIG. 2, a $1000^{th}$ sector of a logical block in a sector view represents a $30^{th}$ page of a $200^{th}$ block of a practical physical block in a NAND view of the memory area 150, and the buffer unit 120 stores mapping information and an erase count of the practically accessed block ($200^{th}$ block). This is merely exemplary, and the invention is not limited thereto. This is done for conceptually describing the loading of the mapping information and the erase count of the worn block whenever the block is erased.

Specifically, the buffer unit 120 according to one aspect or embodiment does not load the erase counts of all the blocks, but loads only the erase counts of the worn blocks. Therefore, the size of the buffer unit 120 need not be large, thereby increasing the cost and area efficiency. The MCU 130 may transmit and receive control commands, address signals, and data signals to and from the host interface 110, or may control the memory controller 140 using those signals, for example.

The memory controller 140 selects a predetermined NAND flash memory (ND) among a plurality of NAND flash memories of the memory area 150, and provides a write command, an erase command, or a read command to the selected NAND flash memory. Specifically, the memory controller 140 according to one embodiment may control the wear leveling process flexibly. That is, the memory controller 140 may manage the uniform use of the memory lifespan efficiently by controlling a searching condition and a searching count of a target block required in the wear leveling process by using two reference values, for example.

Conventionally, the information on the erase counts of all the blocks is stored in a predetermined area of the memory area 150 in a large lump. Hence, at the timing of the wear leveling process, the information on the erase counts of all the blocks is loaded into the buffer unit 120, and a change of the physical location is tried by selecting the block having the minimum erase count as the block which will replace the block having the large erase count. In this case, the buffer unit 120 requires a large memory size because the erase counts of all the blocks must be loaded thereinto.

However, according to one aspect or embodiment, at the time of the wear leveling process, the memory controller 140 does not load the information on the erase counts of all the blocks into the buffer unit 120, but performs the wear leveling process by sampling a predetermined number of blocks according to a searching condition. Furthermore, the memory controller 140, according to one embodiment, adds the erase count whenever the block is erased. When the erase count of the block is larger than a predetermined set value, the wear leveling process is executed. At this time, the accumulated fail count is used as the reference of the block searching condition, and the difference between the erase count of the worn block and the average erase count is used as the searching count reference. In this way, the searching time and the searching condition may be varied flexibly. In other words, according to one embodiment, while the information of the wear leveling process is minimally used, the two searching reference values are set. Hence, the searching time may be reduced, and the searching probability of the replacement target block may be increased. A detailed description thereof will be described later.

The memory area 150 is controlled by the memory controller 140 to perform a data write operation, a data erase operation, and a data read operation. The memory area 150 may be a NAND flash memory, for example. The flash memory cell may be a single level cell (SLC) or a multi level cell (MLC), for example. The memory area 150 may be provided with a plurality of chips, each including a plurality of blocks having a plurality of pages. Meanwhile, the memory area 150 stores the mapping information and the erase count information described above, which are hereinafter referred to as a "mapping page". The mapping page is a page that is a processing unit or a storage unit in the NAND flash memory. The mapping page can be defined as the storing of erase count and mapping information between a logical address and a physical address with respect to single block information. Mapping information may also be referred to as a mapping storage area.

Figure 3:
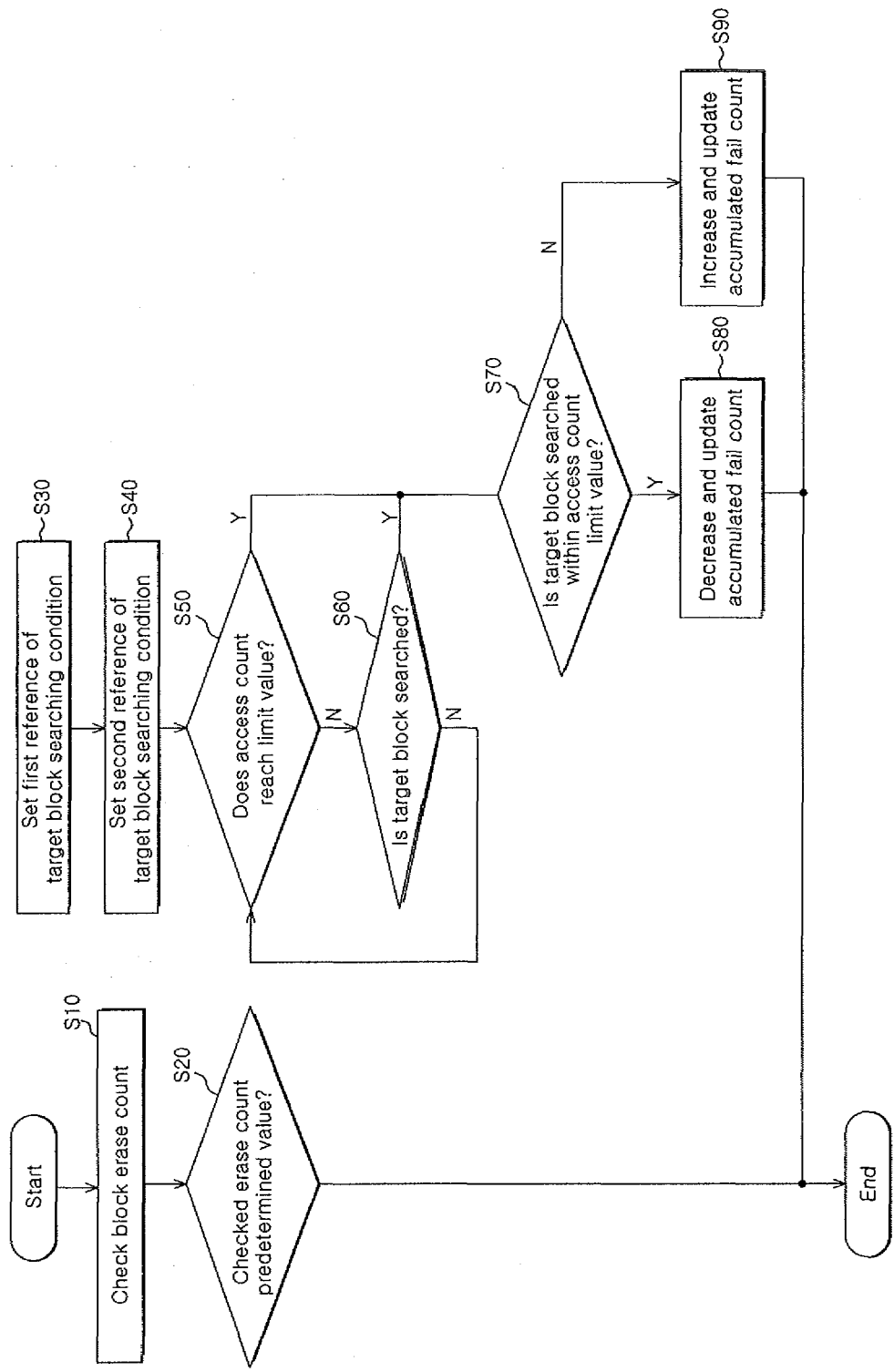
FIG. 3 is a flowchart illustrating a method for controlling the solid-state storage system of FIG. 1.

FIG. 3 is a flowchart illustrating a method for controlling the solid-state storage system of FIG. 1. Although it has been described that whether to execute the wear leveling process is determined at each erase operation, this is merely exemplary. Alternatively, whether to execute the wear leveling process may be determined other than at each erase operation, for example.

Referring to FIGS. 1 through 3, data of an arbitrary block is erased. When the data of the block is erased, the erase count is added and checked (S10). It is then determined whether the checked erase count is larger than a predetermined value (S20). The predetermined value may be calculated by a mathematical expression 1 below.

Predetermined value=(Average value of erase counts+ Error range)     [Mathematical Expression 1]

For example, when the average value of the erase count is 100 and the error range is 40, the predetermined value becomes 140. When the erase count of the worn block is larger than 140, the memory controller 140 controls the execution start of the wear leveling process. A first searching reference value of the target block is set using an accumulated fail count (S30). The accumulated fail count is a type of a flag signal that represents the success or failure in searching the target block that will replace the worn block.

The initial value of the accumulated fail count is set to 0, and the accumulated fail count increases when the target block that will replace the worn block is not searched through the following procedures. This is done for relaxing the erase count reference value of the target block whenever the accumulated fail count increases. In other words, if the accumulated fail count increases, the searching reference value of the target block is relaxed. Specifically, the initial reference value of the block having a small erase count is set to a value obtained by subtracting the error range from the average value of the erase counts. For example, when the average value of the erase counts is 100 and the error range is 40, the initially set reference value of the block having a small erase count becomes 60.

However, when the searching fails, the initially set reference "60" of the block having a small erase count is determined as high. Blocks having an erase count larger than the above erase count are set as the blocks to be replaced. Therefore, whenever the accumulated fail count increases, the reference value of the block having a small erase count may be gradually relaxed by increasing the erase count reference by 5, for example, 45, 50, 55, . . . . However, the allowable accumulated fail count may also be set so that the block having less than the average erase count is selected, while preventing the accumulated fail count from being accumulated endlessly. Consequently, the first searching condition of the target block is the erase counts of the replacement target blocks that serve as the selection reference value of the target block.

Meanwhile, the searching count of the target block is set as the second searching reference value of the target block (S40). The condition for the searching count of the target block means the access count of the mapping page stored in the memory area. The blocks stored in a single mapping page of the memory area may be searched at one-time access. If the target block is not searched at one-time access, another mapping page is accessed and it is determined whether or not there is a target block in the accessed mapping page. Whenever the access count increases, the searching object for the target block increases. The access count is set neither arbitrarily nor uniformly, but is varied flexibly according to the erase count of the worn block. That is, the access count of the mapping page is flexibly controlled to increase according to how much the erase count of the worn block exceeds the sum of the average erase count and the error range. In other words, the access count of the mapping page is flexibly controlled to increase according to the replacement urgency of worn blocks that must be urgently replaced. It is important to know the difference between the erase count of the worn block and the average erase count. A different execution sensibility of the wear leveling process may be applied according to the importance of the system, for example.

Clearly, the execution sensitivity of the wear leveling process is different according to the architecture of the applied solid-state storage system or its usage. The sensitivity of the wear leveling process and the erase count of the block are exemplary illustrated in FIG. 5, and a detailed description thereof will be made later.

As such, it is determined whether the access count meets the second searching condition (S50).

That is, when the access count according to the calculation equation does not reach a predetermined value, the repetition loop is performed until the target block is searched (S60). When the access count reaches the predetermined value, it is determined whether the target block is searched within the access count limit value (S70).

When the target block having less than the set erase count is searched in the course of the repetition loop, the accumulated fail count is decreased and updated (S80). Since this situation meets the first and second searching conditions, the margin to the allowable accumulated fail count may be ensured from the accumulated fail count by decreasing the accumulated fail count by a predetermined value.

When the target block is not searched within the access count limit value, the searching condition must be relaxed. Hence, the accumulated fail count is increased and updated (590). That is, this situation is a case where the target block used as the replacement block is not searched, in spite of the currently set first and second searching conditions. In this case, the accumulated fail count is increased and updated in order to influence a next searching condition, so that the searching success rate of the wear leveling process is increased in a next block erase operation.

In this way, according to one embodiment, the condition for the reference value of the erase count and the condition for the reference value of the searching count are separately set in order to efficiently search the distributed erase count information of the blocks. Unlike the related art, when the replacement of the worn block is required, the wear leveling process of the worn block is performed by scarifying the block that is initially searched as the replacement block, instead of searching the block having a minimum erase count. The initially searched block means that the block searched within the predetermined searching count during the wear leveling process (or searched during the next wear leveling process) initially meets the erase count condition. Therefore, the execution time of the wear leveling process may be reduced, compared with the case where the wear leveling process is executed on all the blocks.

Figures 4, 5:
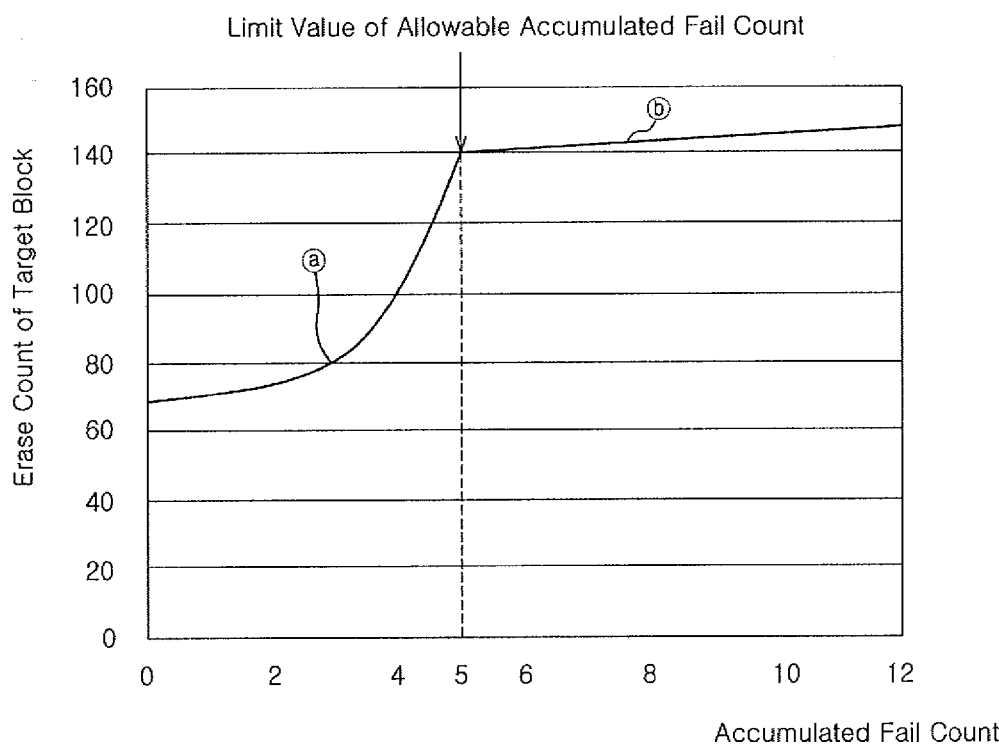
FIG. 4 is a graph showing the correlation between an erase count of a target block and an accumulated fail count of in FIG. 3.
FIG. 5 is a table showing the correlation between a sensitivity and an erase count of a worn block.

FIG. 4 is a graph showing the correlation between the erase count of the target block and the accumulated fail count according to one embodiment. Referring to FIG. 4, an X-axis represents the accumulated fail count, and a Y-axis represents the erase count of the target block. In this case, it is assumed that the average erase count, the error range, and the allowable accumulated fail count are 100, 40, and 5 or less, respectively.

The graph (a) may be implemented by a mathematical expression 2 below.

First searching condition of target block=(Average erase count−Error range)+Error range/(Allowable maximum accumulated fail count−Accumulated fail count)     [Mathematical Expression 2]

However, this mathematical expression is applied when the allowable accumulated fail count is the limit value of 5 or less. If the allowable accumulated fail count is larger than the limit value, it is possible to set the first condition for the target block implemented with a straight line having a smooth slope as illustrated in (b) of FIG. 4.

First condition for target block=(Average erase count+ Upper limit value of threshold error)−Accumulated fail count     [Mathematical Expression 3]

That is, FIG. 4 suggests that it is meaningful to search the target block more actively at the section where the accumulated fail count is less than the allowable accumulated fail count of 5, and it is not greatly meaningful to relax the searching condition for the target block because, when the allowable accumulated fail count is larger than the limit value, the erase count of the target block already exceeds the sum of the average erase count and the limit value.

Therefore, according to one embodiment, the limit value of the allowable accumulated fail count is set to 5, and the solid-state storage system is managed so as not to permit the situation that exceeds the limit value.

FIG. 5 is a table showing the correlation between the sensitivity and the block erase count according to one embodiment.

Referring to FIG. 5, as the erase count of the worn block increases, the searching count according to the sensitivity is set to increase. Furthermore, as the intensity of sensitivity increases, the searching count at the same erase count of the worn block also increases.

Second searching condition for target block=(Basic mapping page access count−1)+(Erase count of worn block)−(Average erase count+limit value))*Sensitivity [Mathematical Expression 4]

The basic mapping page access count, the average erase count, and the limit value are set to 7, 100, and 40, respectively.

Therefore, as the erase count of the worn block is larger than the sum of the average erase count and the limit value, the searching of the target block corresponding to the worn block must be reinforced. Hence, the second searching condition for the target block may be set to increase the mapping access count by using the calculation equation such as the mathematical expression 4, for example.

Meanwhile, since higher-performance systems require higher sensitivity, the mathematical expression 4 may be implemented with a sensitivity function, for example.

Figure 6:
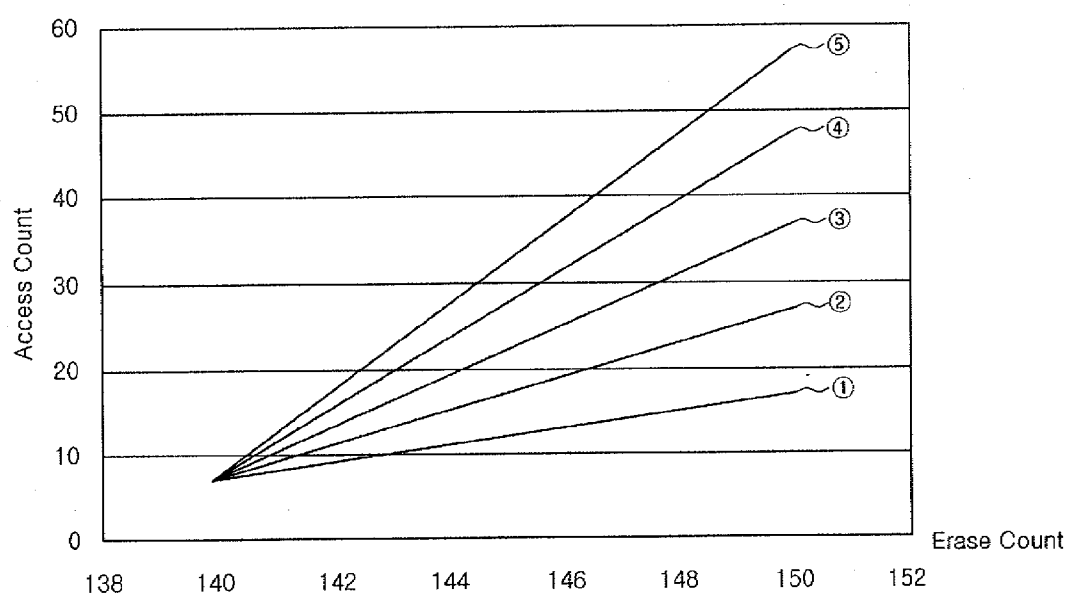
FIG. 6 is a graph showing variation in an erase count and an access count of a worn block according to the sensitivity in FIG. 5.

FIG. 6 is a graph showing the correlation between the sensitivity and the access count. Referring to FIG. 6, an X-axis represents the erase count of the worn block, and a Y-axis represents the access count.

As described above, the access count is calculated using the mathematical expression 4. At this time, if the sensitivity of FIG. 5 is applied, the slope of the graph becomes steeper according to the intensity of sensitivity. That is, the graphs ① to ⑤ of FIG. 6 correspond to the intensities of sensitivity 1 to 5 described in FIG. 5. The access count with respect to the erase count is varied according to the intensity of sensitivity.

For example, when the erase count is 150, the access count is distributed in a range from 18 to 58 according to the intensity of sensitivity. As the sensitivity of the system is higher, the searching of the target block is reinforced even though the access count increases.

As such, during the wear leveling process, the information on the erase counts of all the blocks cannot be loaded and the whole comparison may be impossible. Thus, the target block is efficiently searched by setting the searching condition appropriately.

Instead of searching the target block having the lowest value, the block having the replaceable value is searched at the shortest time. That is, instead of the target block having the lowest value, the initially searched block having the replacement ability is sacrificed by the wear leveling process of the worn block. To this end, the erase count of the target block, which is the first searching condition for the target block, may be controlled while being varied in order to increase the searching success rate, and the number of the target blocks to be searched may be increased according to the replacement urgency degree of the worn block.

According to one embodiment, even when the size of the memory increases, it is unnecessary to increase the size of the buffer unit configured to temporarily store the mapping information and the erase count information, but rather, the buffer unit may be maintained with a smaller size than that of the related art. The mapping information and the erase count information of only the worn block are loaded, and the condition for the erase count reference value and the condition for the searching count reference value are separately set. Therefore, the execution time of the wear leveling process may be reduced. Consequently, since the execution time of the wear leveling process is reduced while the size of the buffer unit is reduced, the operational performance and cost efficiency of the sold state storage system may be improved.

While certain embodiments have been described above, it will be understood to those skilled in the art that the embodiments described are by way of example only. Accordingly, the system and method described herein should not be limited based on the described embodiments. Rather, the system and method described herein should only be limited in light of the claims that follow when taken in conjunction with the above description and accompanying drawings.

What is claimed is:

1. A solid-state storage system comprising:
    a buffer unit configured to load a partial of mapping pages, each of the mapping pages including a mapping information and an erase count corresponding to a memory block; and
    a memory controller configured to search a target block based on an accumulated fail count which is a number of failure in searching a target block during a previous wear leveling process and an access count of the mapping pages, and configured to execute a wear leveling process replacing a worn block to the target block.

2. The solid state storage system according to claim 1, wherein the memory controller determines whether to execute the wear leveling process whenever data is erased.

3. The solid-state storage system according to claim 2, wherein the memory controller varies a number of the target block whenever a wear leveling process is executed.

4. The solid-state storage system according to claim 3, wherein the memory controller increases the accumulated fail count when searching of the target block fails and increases the number of the target block according to the increased accumulated fail count when a next wear leveling process is executed.

5. The solid-state storage system according to claim 2, wherein the memory controller increases the access count of the mapping pages and increases the number of the target block according to the increased access count of the mapping pages.

6. The solid-state storage system according to claim 5, wherein when an erase count of the worn block is larger than a previously set value, the memory controller increases the access count of the mapping pages.

7. The solid-state storage system according to claim 6, wherein as the access count of the mapping pages increases, the memory controller increases the number of mapping pages loaded into the buffer unit.

8. The solid-state storage system according to claim 7, wherein the mapping pages are loaded into the buffer unit sequentially.

9. The solid-state storage system according to claim 1, further comprising a flash memory area including a plurality of memory blocks, wherein the plurality of memory blocks includes the mapping pages.

10. A solid-state storage system comprising:
    a flash memory area comprising memory blocks configured to store a mapping page in which mapping information and erase count of the memory blocks are stored; and
    a memory controller configured to vary a number of a target block which is to replace a worn block among the memory blocks by using an accumulated fail count which is a number of failure in searching a target block and an access count of the mapping pages during a wear leveling process.

11. The solid-state storage system according to claim 10, wherein the memory controller increases the number of the target block in order to improve a searching success rate of the target block.

12. The solid-state storage system according to claim 11, wherein the memory controller increases the accumulated fail count when a searching of the target block fails during a previous wear leveling process.

13. The solid-state storage system according to claim 12, wherein the memory controller increases the access count of the mapping pages for increasing the number of the target block.

14. The solid-state storage system according to claim 10, wherein the memory controller decreases the accumulated fail count when a searching of the target block succeeds during a previous wear leveling process so as to decrease the number of the target block.

15. A method for controlling a solid-state storage system, comprising the steps of:
setting a first reference value according to an accumulated fail count which is a number of failure in searching a target block during a previous wear leveling process;
setting a second reference value according to an access count of mapping pages;
setting a target block searching condition according to the first reference value and the second reference value; and
searching a target block which is to replace a worn block based on the target block searching condition during a wear leveling process.

16. The method according to claim 15, wherein the target block searching condition is varied whenever the accumulated fail count increases.

17. The method according to claim 16, wherein a number of blocks to be searched as the target block is increased according to the varied target block searching condition.

18. The method according to claim 15, wherein the target block searching condition is varied whenever the access count of mapping pages increases.

19. The method according to claim 18, wherein the access count of mapping pages is increased when an erase count of the worn block exceeds a sum of an average erase count and an error range.

20. The method according to claim 19, wherein a number of blocks to be searched as the target block is increased according to the varied target block searching condition.

\* \* \* \* \*